_(12)_ United States Patent
Hidaka (10) Patent No.: US 7,890,068 B2
(45) Date of Patent: Feb. 15, 2011

(54) COMMUNICATION SYSTEM, TRANSMITTING DEVICE, AND RECEIVING DEVICE

(75) Inventor: Isao Hidaka, Tokyo (JP)

(73) Assignee: Sony Corporation (JP)

( * ) Notice: Subject to any disclaimer, the term of this patent is extended or adjusted under 35 U.S.C. 154(b) by 809 days.

(21) Appl. No.: 11/149,596

(22) Filed: Jun. 10, 2005

(65) Prior Publication Data

US 2005/0276245 A1    Dec. 15, 2005

(30) Foreign Application Priority Data

Jun. 10, 2004    (JP)    ............ P2004-172180

(51) Int. Cl.
*H04B 7/08* (2006.01)
*H04B 1/18* (2006.01)
*H04B 1/06* (2006.01)
*H04B 7/00* (2006.01)
*H04W 4/00* (2009.01)

(52) U.S. Cl. .......... 455/132; 455/193.1; 455/272; 370/328; 370/310.2

(58) Field of Classification Search .......... 370/328, 370/310.2; 455/132, 191.1, 193.2, 207, 206, 455/246.1, 272, 273, 280
See application file for complete search history.

(56) References Cited

U.S. PATENT DOCUMENTS

| 5,345,600 | A | 9/1994 | Davidson | |
|---|---|---|---|---|
| 6,529,492 | B1 * | 3/2003 | Miya | ............ 370/335 |
| 6,968,013 | B2 * | 11/2005 | Awater et al. | ............ 375/262 |
| 7,249,292 | B2 * | 7/2007 | Kim | ............ 714/707 |
| 7,453,854 | B2 * | 11/2008 | Fujishima et al. | ............ 370/335 |
| 2003/0050033 | A1 * | 3/2003 | Kawaguchi | ............ 455/277.1 |
| 2004/0042427 | A1 * | 3/2004 | Hottinen | ............ 370/335 |
| 2004/0087275 | A1 * | 5/2004 | Sugar et al. | ............ 455/61 |
| 2004/0087324 | A1 * | 5/2004 | Ketchum et al. | ............ 455/513 |
| 2004/0132414 | A1 * | 7/2004 | Sendyk et al. | ............ 455/73 |
| 2004/0174840 | A1 * | 9/2004 | Yano et al. | ............ 370/328 |
| 2004/0208145 | A1 * | 10/2004 | Sim et al. | ............ 370/335 |
| 2006/0121946 | A1 * | 6/2006 | Walton et al. | ............ 455/561 |
| 2006/0135081 | A1 * | 6/2006 | Mysore et al. | ............ 455/70 |

FOREIGN PATENT DOCUMENTS

| JP | 55-097746 A | 7/1980 |
|---|---|---|
| JP | 09-502065 A | 2/1997 |
| JP | 2000-201130 A | 7/2000 |
| JP | 2002-344965 A | 11/2002 |
| WO | WO-2004/039011 A2 | 5/2004 |

OTHER PUBLICATIONS

L.M. Davis, et al., System Architectur and ASICs for a MIMO 3GPP-HSDPA Receiver, 2003 IEEE, pp. 818-822.

* cited by examiner

*Primary Examiner*—Andrew Wendell
(74) *Attorney, Agent, or Firm*—Lerner, David, Littenberg, Krumholz & Mentlik, LLP (57) ABSTRACT

A receiving device includes a first demodulator operable to demodulate data transmitted by at least one of a plurality of propagation paths in a first channel having transfer functions which are different from one another; a second demodulator operable to demodulate data transmitted by at least one of a plurality of propagation paths in a second channel having transfer functions which are different from one another; and a data processor operable to merge the data demodulated by the first demodulator and the data demodulated by the second demodulator.

5 Claims, 11 Drawing Sheets

COMMUNICATION SYSTEM, TRANSMITTING DEVICE, AND RECEIVING DEVICE

CROSS-REFERENCE TO RELATED APPLICATIONS

The present application claims priority from Japanese Application No. 2004-172180 filed Jun. 10, 2004, the disclosure of which is hereby incorporated by reference herein.

BACKGROUND OF THE INVENTION

The present invention relates to a communication system for transmitting and receiving divided pieces of data simultaneously by different transmission paths, and particularly to a communication system, a transmitting device, a receiving device, a processing method therein, and a program for making a computer carry out the method.

A frequency diversity system is a method that transmits an identical signal by a plurality of different carriers, and selects or synthesizes the carriers on a receiver side, thereby improving characteristics (see Japanese Patent Laid Open No. 2000-201130 (FIG. 5), for example). However, this frequency diversity system has a problem in that the transmission rate is not improved that much, considering the hardware resources put in to deal with a plurality of different carriers for simultaneous transmission of an identical signal. With current technology, for example, the maximum radio transmission speed in an IEEE802.11a standard by a working group of an IEEE (Institute of Electrical and Electronics Engineers) 802 standardization committee, for example, is 54 Mbps (bits/second), which cannot be said to be sufficient as compared with wire transmission speeds.

Hence, transmission path multiplexing by simultaneous transmission and reception of a plurality of radio signals is considered. In this case, original data to be transmitted is divided into a plurality of pieces, and these divided pieces of data are transmitted by respective different transmission paths. For example, when a plurality of radio signals in different channels in an identical frequency band or channels in different frequency bands are used simultaneously, since performance is determined by the transfer characteristics in each channel, even if the transmission speed of one channel is lowered due to multipath effects or the like, performance deterioration can be minimized by using the other channel. In addition, when radio waves are sufficiently reflected or scattered due to a multipath, this can be taken advantage of instead to improve performance by using an identical channel in an identical frequency band.

However, when radio signals in different channels in an identical frequency band or channels in different frequency bands as different transmission paths are used, the number of channels, which number corresponds to the number of pieces of data to be transmitted simultaneously, is required. Thus, there may be an inconvenience from a viewpoint of use efficiency. On the other hand, the use of an identical channel in an identical frequency band as different transmission paths can be dealt with in theory by increasing the number of transmitting and receiving antennas and RF circuits in the identical frequency band. However, a data separation process on the transmitter side becomes extremely complex as the number of pieces of data to be transmitted is increased, and therefore, the number of pieces of data to be transmitted simultaneously is strictly limited.

It is accordingly desirable to improve the transmission rate while limiting the use of frequency bands in radio communications and alleviating the complications of the data separation process.

SUMMARY OF THE INVENTION

According to a first embodiment of the present invention, there is provided a receiving device, including first demodulating means for demodulating data transmitted by at least one of a plurality of propagation paths in a first channel having transfer functions which are different from one another; second demodulating means for demodulating data transmitted by at least one of a plurality of propagation paths in a second channel having transfer functions which are different from one another; and data processing means for merging the data demodulated by the first demodulating means and the data demodulated by the second demodulating means. Thereby, an effect is produced in that the transmission rate is improved while limiting the use of frequency bands and alleviating the complication of a data separation process by using propagation paths having different transfer functions in each of the first channel and the second channel.

According to a second embodiment of the present invention, the first demodulating means in the receiving device according to the first embodiment of the present invention includes switching means for switching between demodulation of data transmitted in a divided state by the plurality of propagation paths in the first channel and demodulation of data transmitted by one of the plurality of propagation paths in the first channel. Thereby, an effect is produced in that a selection is made as appropriate between the use of the plurality of propagation paths and transmission by one propagation path according to the communication quality in the first channel.

According to a third embodiment of the present invention, the data processing means in the receiving device according to the first embodiment of the present invention includes data determining means for determining a reception state of the demodulated data; and response output means for outputting a response indicating whether data reception in each of the plurality of propagation paths has succeeded based on the reception state of the demodulated data. Thereby, an effect is produced in that the reception state of the data is communicated to a transmitter side to be used in data allocation for subsequent transmission.

According to a fourth embodiment of the present invention, data in an original state is divided and transmitted in a divided state, and the data processing means in the receiving device according to the first embodiment of the present invention includes data merging means for collecting the demodulated data and merging the demodulated data into data in the original state; and a data buffer for retaining the merged data. Thereby, an effect is produced in that data transmitted in a divided state is returned to an original state and then retained.

According to a fifth embodiment of the present invention, there is provided a transmitting device, including data processing means for generating first transmission data and second transmission data to be transmitted; first modulating means for modulating the first transmission data for transmission by at least one of a plurality of propagation paths in a first channel having transfer functions which are different from one another; and second modulating means for modulating the second transmission data for transmission by at least one of a plurality of propagation paths in a second channel having transfer functions which are different from one another. Thereby, an effect is produced in that the transmission rate is improved while limiting the use of frequency bands and alleviating the complication of a data separation process by using propagation paths having different transfer functions in each of the first channel and the second channel.

According to a sixth embodiment of the present invention, the first modulating means in the transmitting device according to the fifth embodiment of the present invention includes switching means for switching between modulation for transmitting the first transmission data in a divided state by the plurality of propagation paths in the first channel and modulation for transmitting the first transmission data by one of the plurality of propagation paths in the first channel. Thereby, an effect is produced in that a selection is made as appropriate between use of the plurality of propagation paths and use of one of the plurality of propagation paths according to the communication quality in the first channel.

According to a seventh embodiment of the present invention, the data processing means in the transmitting device according to the fifth embodiment of the present invention includes response determining means for receiving a response indicating whether data transmission in each of the plurality of propagation paths has succeeded, and for determining a transmission state of the first and second transmission data; and data allocating means for allocating data to be transmitted next based on the transmission state of the first and second transmission data. Thereby, an effect is produced in that subsequent data allocation is controlled according to whether a previous data transmission has succeeded.

According to an eighth embodiment of the present invention, there is provided a communication system, including a transmitting device for transmitting data in a divided state by a first channel and a second channel; and a receiving device for receiving the data transmitted by the transmitting device; wherein the transmitting device includes data processing means for generating first transmission data and second transmission data to be transmitted, first modulating means for modulating the first transmission data for transmission by at least one of a plurality of propagation paths in the first channel having transfer functions which are different from one another, and second modulating means for modulating the second transmission data for transmission by at least one of a plurality of propagation paths in the second channel having transfer functions which are different from one another, and the receiving device includes first demodulating means for demodulating data transmitted by at least one of the plurality of propagation paths in the first channel, second demodulating means for demodulating data transmitted by at least one of the plurality of propagation paths in the second channel, and data processing means for merging the data demodulated by the first demodulating means and the data demodulated by the second demodulating means. Thereby, an effect is produced in that the transmission rate is improved while limiting the use of frequency bands and alleviating the complication of a data separation process by using propagation paths having different transfer functions in each of the first channel and the second channel.

The present invention can produce an excellent effect of improving the transmission rate while limiting the use of frequency bands in radio communications and alleviating the complication of a data separation process.

DETAILED DESCRIPTION

A preferred embodiment of the present invention will next be described in detail with reference to the drawings.

Figure 1:
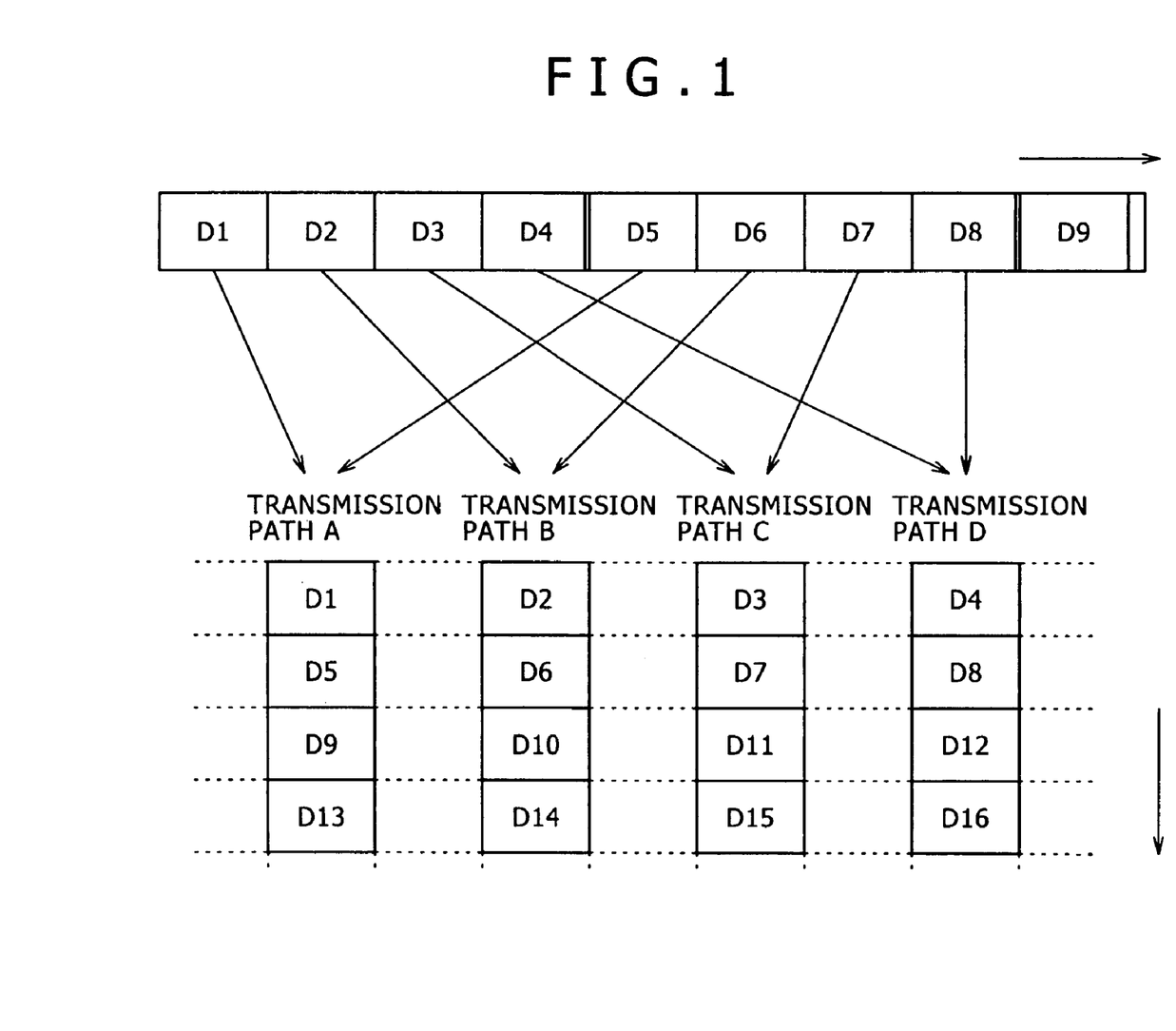
FIG. 1 is a diagram showing an outline of data transmission by a plurality of transmission paths according to an embodiment of the present invention.

FIG. 1 is a diagram showing an outline of data transmission by a plurality of transmission paths according to an embodiment of the present invention. Data to be transmitted by a transmitting device is divided sequentially from a start of the data into pieces of data D1 to D4, D5 to D8, . . . . The divided pieces of data are allocated to a plurality of different transmission paths and transmitted in such a manner that the data D1 is transmitted in a transmission path A, the data D2 is transmitted in a transmission path B, the data D3 is transmitted in a transmission path C, and the data D4 is transmitted in a transmission path D, for example. It is to be noted that while the description below will be for an example of transmission by the four transmission paths A, B, C, and D for convenience, the number of transmission paths can be set arbitrarily.

The divided pieces of data D1 to D4 are transmitted simultaneously by the different transmission paths A to D. While the modulation modes in the respective transmission paths do not need to be the same, it is desirable to set the number of bits at the time of data division such that the time lengths required for the transmission are substantially the same. After the pieces of data D1 to D4 are transmitted, the pieces of data D5 to D8 are transmitted simultaneously by the different transmission paths A to D. As long as a communication state in each transmission path permits, such simultaneous transmission by the transmission paths A to D is sequentially performed.

There is no particular limitation on the specific frequencies for the transmission paths A to D. However, supposing use in a wireless LAN (Local Area Network), use of a 2.4-GHz band and a 5-GHz band, for example, is considered. The IEEE802.11 standard specifies use of the 2.4-GHz band. The IEEE802.11a standard as an extension of the IEEE802.11 standard uses the 5-GHz band, and employs an OFDM system as a modulation system. It is therefore possible to realize a high transmission rate by using the OFDM system of the IEEE802.11a standard in both the 5-GHz band and the 2.4-GHz band simultaneously.

On the other hand, the IEEE802.11b standard and the IEEE802.11g standard as other extension standards use a DSSS (Direct Sequence Spread Spectrum) system in the 2.4-GHz band. Thus, by using the OFDM system in the 5-GHz band and the DSSS system in the 2.4-GHz band, it is possible to realize a high transmission rate while maintaining compatibility between the IEEE802.11a, IEEE802.11b, and IEEE802.11g standards.

Figure 2A:
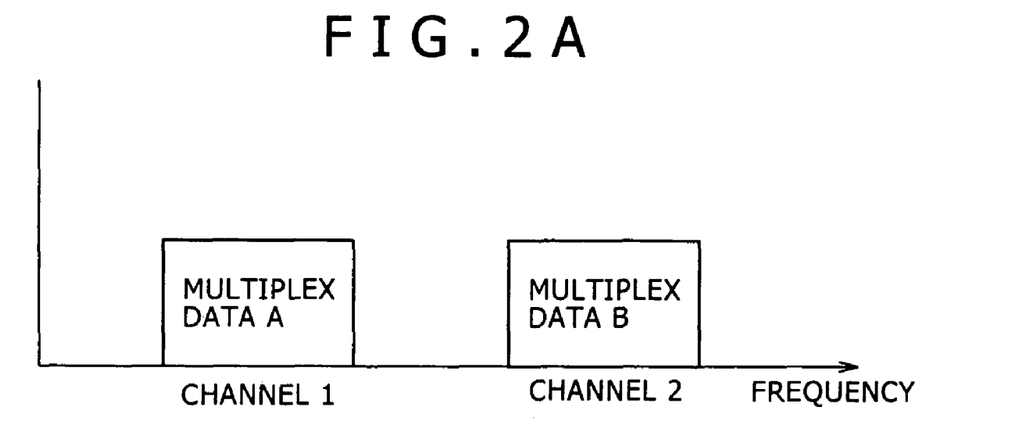
FIGS. 2A, 2B, and 2C are diagrams showing examples of data transmission by a plurality of transmission paths.
Figure 2B:
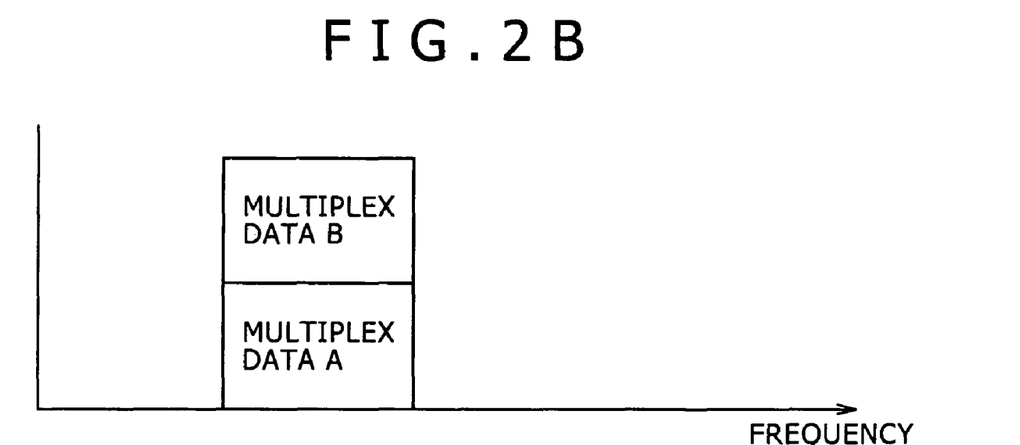
Figure 2C:
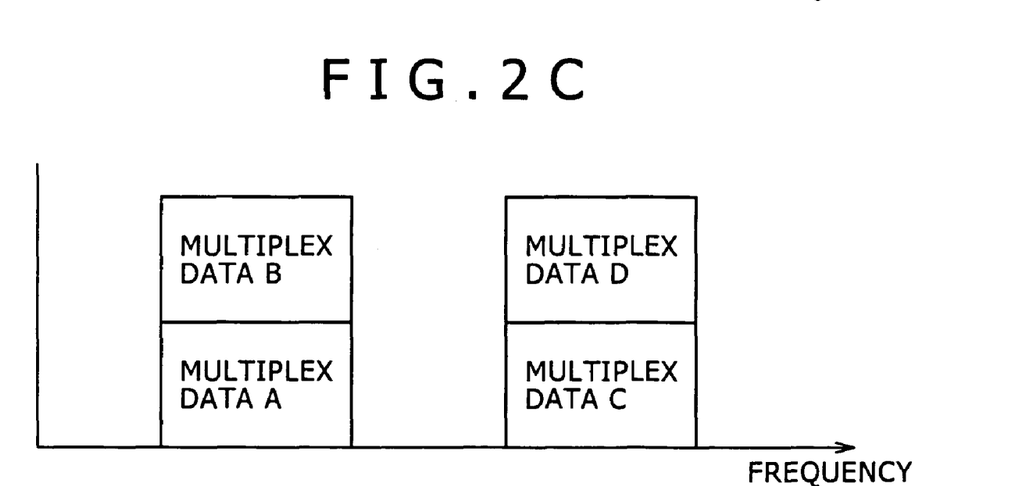

FIGS. 2A, 2B, and 2C are diagrams showing examples of data transmission by a plurality of transmission paths. In simultaneous communication by a plurality of different transmission paths, roughly two systems are considered. In one system, simultaneous communication is performed by using different frequency bands or different channels as transmission paths, as shown in FIG. 2A. Pieces of multiplex data A and B do not interfere with each other, and are transmitted by different paths. In this case, performance in each channel is determined by the transfer characteristics of the channel. Hence, when the transmission speed of one channel is lowered due to multipath effects, for example, the other channel is used to thereby minimize performance deterioration. Such a system will hereinafter be referred to as a frequency multiplex system.

In the other system, simultaneous communication is performed by using propagation paths having different transfer functions in the same channel as the transmission paths, as shown in FIG. 2B. This system is based on the theory that when radio waves are sufficiently reflected or scattered due to a multipath, and transmission and reception are performed by a plurality of antennas arranged at appropriate intervals, the transmission speed is in proportion to the number of antennas. This system is referred to as a MIMO (Multiple Input Multiple Output) system.

In the embodiment of the present invention, MIMO communication is performed in different frequency bands or different channels, as shown in FIG. 2C. That is, in this system, simultaneous communication is performed by using propagation paths having different transfer functions, and further the degree of multiplexing is increased in the frequency direction. This system thereby improves the transmission rate without complicating the data separation process and without unnecessarily widening the frequency bands.

Figure 3:
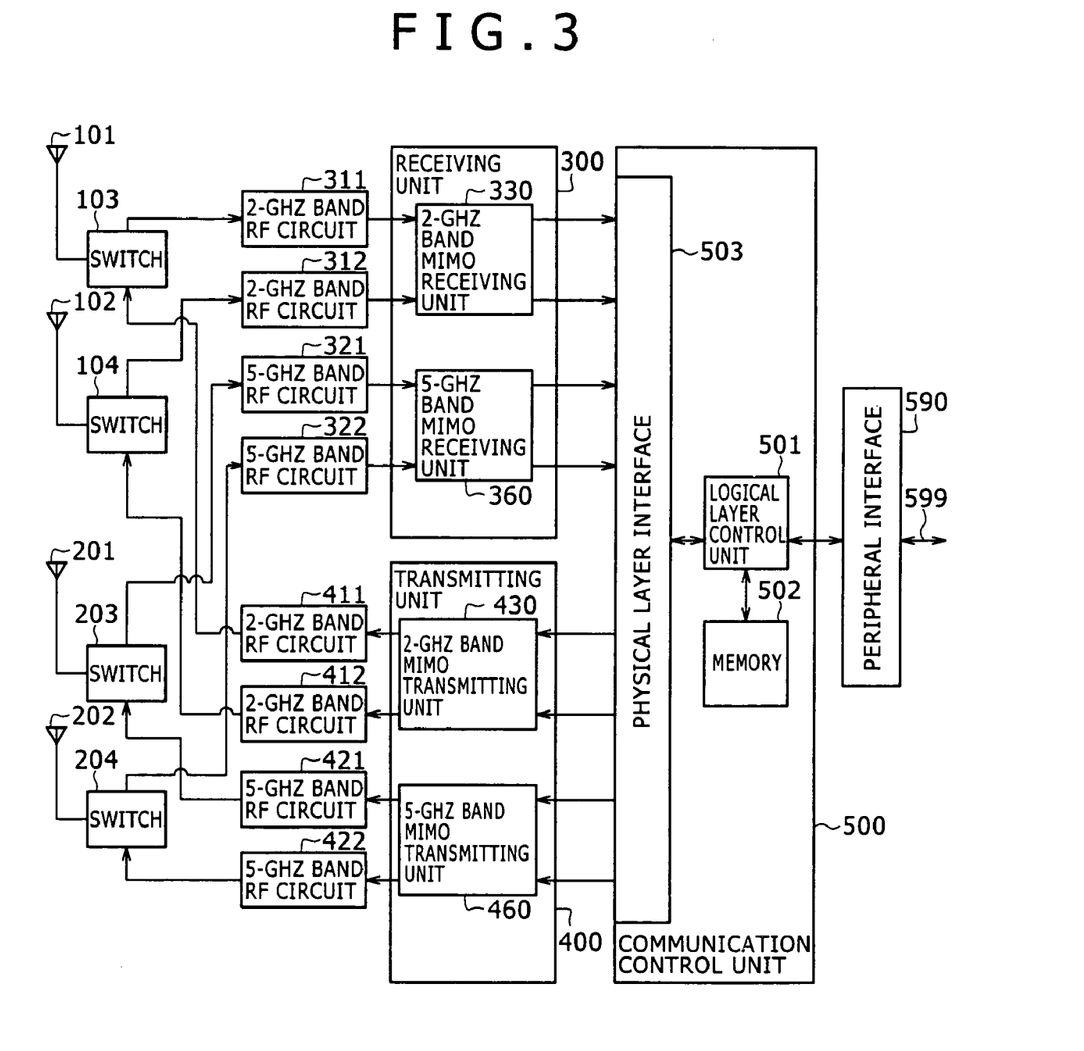
FIG. 3 is a diagram showing an example of the configuration of a communication device according to the embodiment of the present invention.

FIG. 3 is a diagram showing an example of the configuration of a communication device according to the embodiment of the present invention. This communication device includes antennas 101, 102, 201, and 202, switches 103, 104, 203, and 204, RF circuits 311, 312, 321, 322, 411, 412, 421, and 422, a receiving unit 300, a transmitting unit 400, a communication control unit 500, and a peripheral interface 590.

The antennas 101, 102, 201, and 202 are used to transmit and receive different signals. In this example, the antennas 101 and 102 transmit and receive high frequency signals in a 2-GHz band, and the antennas 201 and 202 transmit and receive high frequency signals in a 5-GHz band. The switches 103, 104, 203, and 204 are connected to the antennas 101, 102, 201, and 202, respectively. The switches 103, 104, 203, and 204 change connection so as to enable a connection between the receiving unit 300 and the antennas 101, 102, 201, and 202 at a time of reception, and a connection between the transmitting unit 400 and the antennas 101, 102, 201, and 202 at a time of transmission.

The RF (Radio Frequency) circuits 311, 312, 321, and 322 are arranged between the receiving unit 300 and the switches 103, 104, 203, and 204, respectively, and the RF circuits 411, 412, 421, and 422 are arranged between the transmitting unit 400 and the switches 103, 104, 203, and 204, respectively. The RF circuits 311, 312, 321, 322, 411, 412, 421, and 422 perform conversion between high frequency signals on the side of the switches 103, 104, 203, and 204 and intermediate signals on the side of the receiving unit 300 and the transmitting unit 400. In this example, the RF circuits 311 and 312 function as circuits for reception in the 2-GHz band; the RF circuits 321 and 322 function as circuits for reception in the 5-GHz band; the RF circuits 411 and 412 function as circuits for transmission in the 2-GHz band; and the RF circuits 421 and 422 function as circuits for transmission in the 5-GHz band.

The receiving unit 300 receives intermediate signals from the RF circuits 311, 312, 321, and 322, and performs the latter half of a reception process in a physical layer. The receiving unit 300 in this example includes a 2-GHz band MIMO receiving unit 330 and a 5-GHz band MIMO receiving unit 360. The receiving unit 300 thereby receives signals transmitted by MIMO simultaneously in each of the 2-GHz band and the 5 GHz band. The signals processed by the 2-GHz band MIMO receiving unit 330 and the 5-GHz band MIMO receiving unit 360 are supplied to the communication control unit 500.

The transmitting unit 400 receives signals from the communication control unit 500, and supplies intermediate signals in the physical layer to the RF circuits 411, 412, 421, and 422. The transmitting unit 400 in this example includes a 2-GHz band MIMO transmitting unit 430 and a 5-GHz band MIMO transmitting unit 460. The transmitting unit 400 thereby performs simultaneous transmission by MIMO in each of the 2-GHz band and the 5-GHz band.

The communication control unit 500 performs processing mainly in a logical layer. The communication control unit 500 includes a logical layer control unit 501, a memory 502, and a physical layer interface 503. The logical layer control unit 501 processes frames in a MAC (Media Access Control) sublayer in a data link layer as the logical layer, for example. The memory 502 retains work data and the like necessary for processing by the logical layer control unit 501. The physical layer interface 503 is an interface for exchange with the physical layer realized by the receiving unit 300 and the transmitting unit 400.

The peripheral interface 590 is an interface for connecting the communication device. When the communication device is a terminal station, a host interface is used as the peripheral interface 590, and a host apparatus such as a computer or the like is connected to a port 599 of the host interface. When the communication device is a base station, on the other hand, a network interface is used as the peripheral interface 590, and a modem for using the Internet or the like is connected to a port 599 of the network interface.

Figure 4:
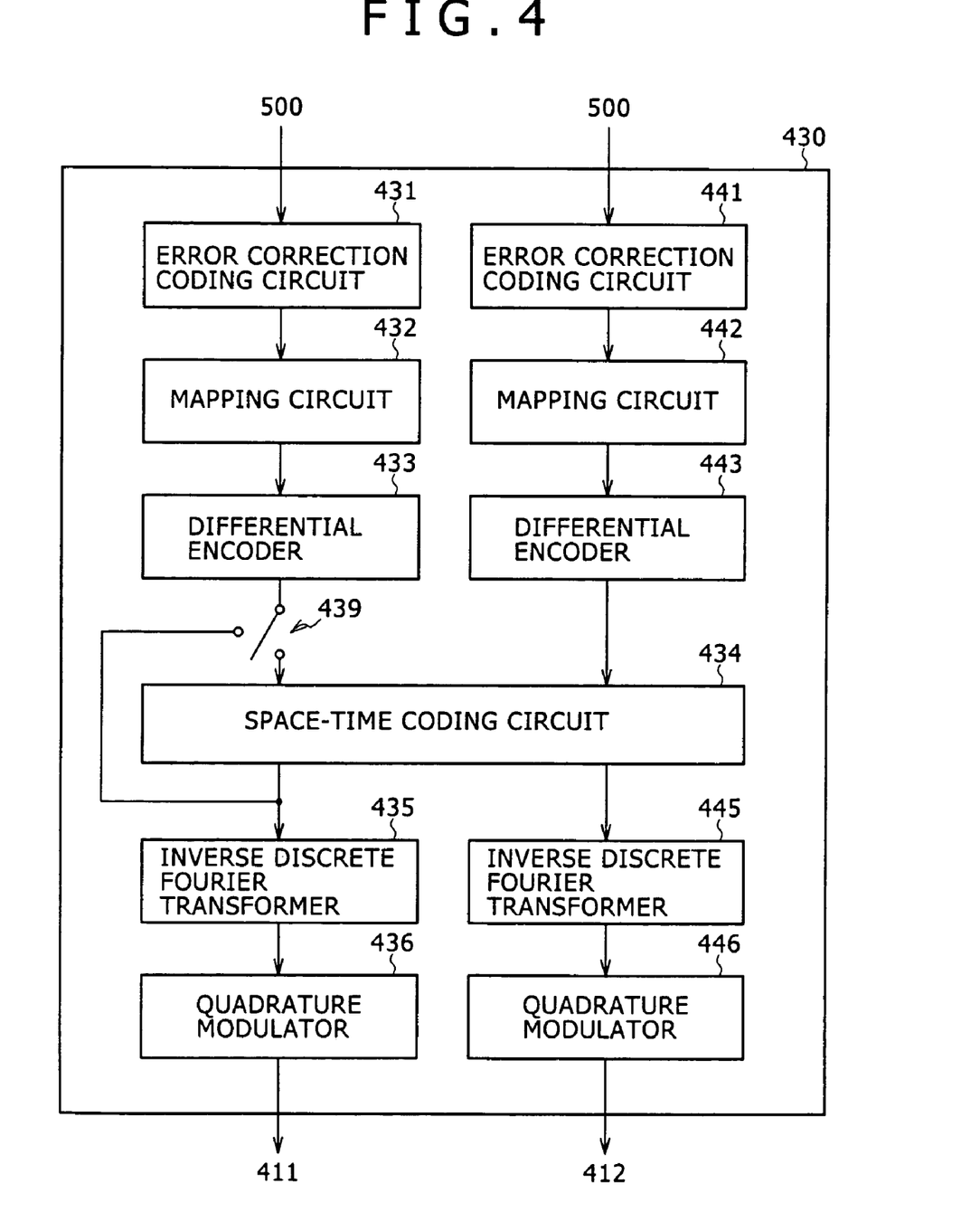
FIG. 4 is a diagram showing an example of the configuration of a MIMO transmitting unit 430 in the embodiment of the present invention.

FIG. 4 is a diagram showing an example of the configuration of the MIMO transmitting unit 430 in the embodiment of the present invention. Supposing the OFDM system, the MIMO transmitting unit 430 includes error correction coding circuits 431 and 441, mapping circuits 432 and 442, differential encoders 433 and 443, a space-time coding circuit 434, inverse discrete Fourier transformers 435 and 445, quadrature modulators 436 and 446, and a switch 439.

The error correction coding circuits 431 and 441 perform encoding by convolutional code or the like according to a bit rate. The mapping circuits 432 and 442 map each piece of data error-correction-coded by the error correction coding circuits 431 and 441 into a complex data symbol. The differential encoders 433 and 443 subject the complex data symbol mapped by the mapping circuits 432 and 442 to differential encoding, and allocate complex data to each subcarrier.

The space-time coding circuit 434 performs a coding process for space multiplexing of the complex data differential-encoded by the differential encoders 433 and 443. However, the switch 439 is connected to one input of the space-time coding circuit 434. The switch 439 can be set such that the process in the space-time coding circuit 434 is bypassed. It is thereby possible to inhibit a MIMO modulation function according to the state of the transmission paths, and to change to the frequency multiplex system represented in FIG. 2A. Incidentally, the switch 439 can be controlled by the communication control unit 500.

The inverse discrete Fourier transformers 435 and 445 modulate the complex data differential-encoded by the differential encoders 433 and 443 or further coded by the space-time coding circuit 434 by inverse Fourier transform, and thereby generate a baseband signal (an I signal and a Q signal). The quadrature modulators 436 and 446 subject the baseband signal to quadrature modulation, and thereby generate an intermediate signal in a predetermined intermediate frequency band.

Incidentally, while an example of the configuration of the MIMO transmitting unit 430 has been illustrated above, the MIMO transmitting unit 460 has the same configuration as the MIMO transmitting unit 430.

Figure 5:
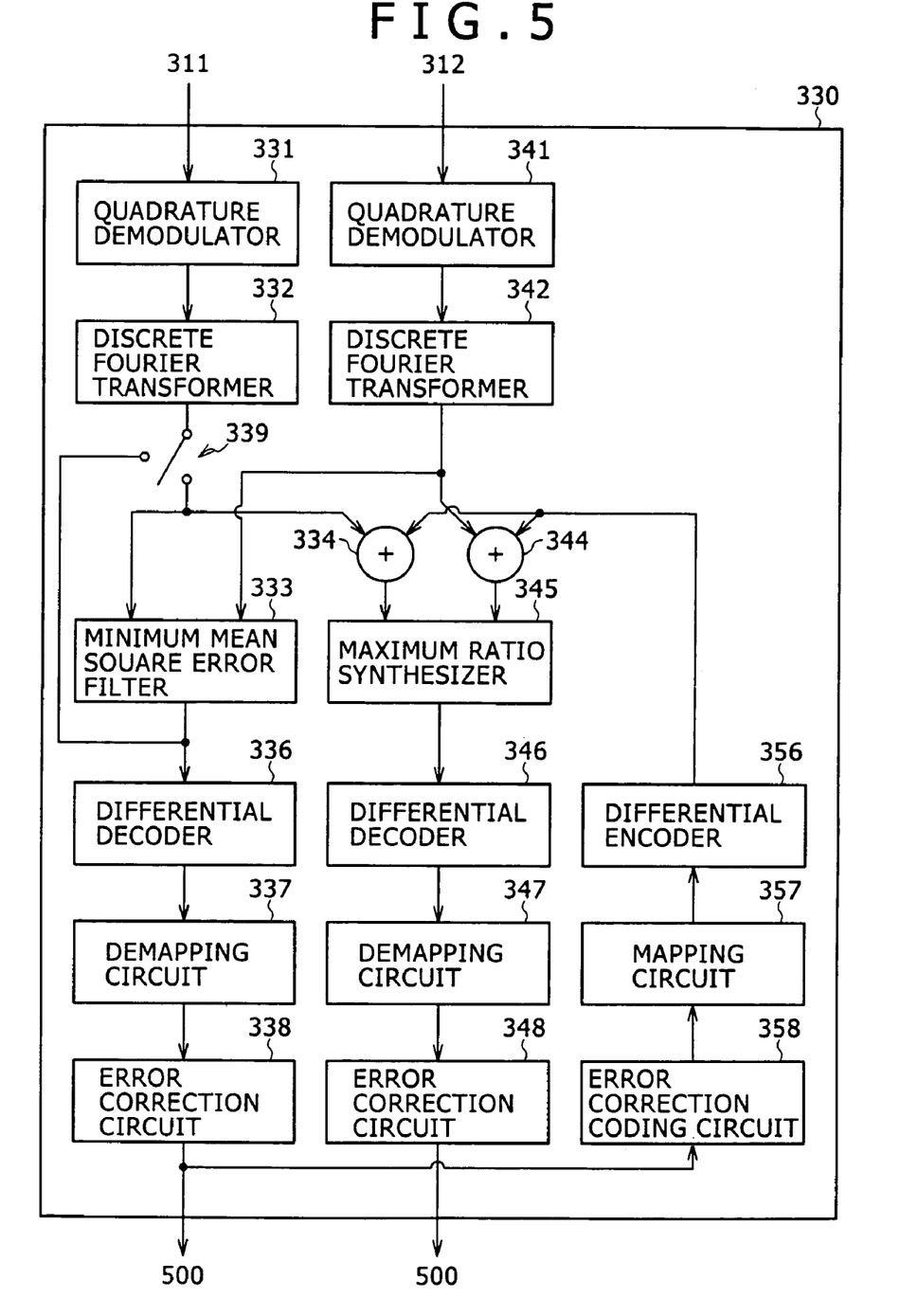
FIG. 5 is a diagram showing an example of the configuration of a MIMO receiving unit 330 in the embodiment of the present invention.

FIG. 5 is a diagram showing an example of the configuration of the MIMO receiving unit 330 in the embodiment of the present invention. Supposing the OFDM system, the MIMO receiving unit 330 includes quadrature demodulators 331 and 341, discrete Fourier transformers 332 and 342, a minimum mean square error filter 333, adders 334 and 344, a maximum ratio synthesizer 345, differential decoders 336 and 346, demapping circuits 337 and 347, error correction circuits 338 and 348, an error correction coding circuit 358, a mapping circuit 357, a differential encoder 356, and a switch 339.

The quadrature demodulators 331 and 341 subject an intermediate signal from the RF circuits 311 and 312 to quadrature detection, and thereby extract a baseband signal including an in phase signal (I signal) in phase with the intermediate signal and a quadrature signal (Q signal) as a quadrature component of the intermediate signal. The discrete Fourier transformers 332 and 342 subject the baseband signal extracted by the quadrature demodulators 331 and 341 to Fourier transform in effective symbol lengths excluding guard intervals, and thereby demodulate complex data of each subcarrier.

The minimum mean square error filter 333 extracts complex data of a first channel from the complex data of each subcarrier, which data is generated by the discrete Fourier transformers 332 and 342. The maximum ratio synthesizer 345 reconverts decoded data identified in the first channel to complex data, feeds back the data, and identifies complex data of a second channel. An input part of the maximum ratio synthesizer 345 is connected with the adders 334 and 344 for adding an output of the differential encoder 356 to the outputs of the discrete Fourier transformers 332 and 342, respectively.

However, one input of the minimum mean square error filter 333 and one input of the adder 334 are connected to the common switch 339. The switch 339 can be set such that the process in the minimum mean square error filter 333 and the maximum ratio synthesizer 345 is bypassed. It is thereby possible to inhibit a MIMO demodulation function according to the state of the transmission paths, and to change to the frequency multiplex system represented in FIG. 2A. Incidentally, the switch 339 can be controlled by the communication control unit 500.

The differential decoders 336 and 346 subject the complex data demodulated by the discrete Fourier transformers 332 and 342 or further processed by the minimum mean square error filter 333 and the maximum ratio synthesizer 345 to differential decoding, and are used in a PSK system, for example. The demapping circuits 337 and 347 demap the complex data decoded by the differential decoders 336 and 346, and thereby extract a data symbol. The error correction circuits 338 and 348 detect data errors and correct the data by Viterbi decoding or the like. The data thus obtained is output to the physical layer interface 503 of the communication control unit 500.

Also, an output of the error correction circuit 338 is returned to complex data by the error correction coding circuit 358, the mapping circuit 357, and the differential encoder 356. The complex data is fed back to one input of the adder 334 and one input of the adder 344.

Incidentally, while an example of the configuration of the MIMO receiving unit 330 has been illustrated above, the MIMO receiving unit 360 has the same configuration as the MIMO receiving unit 330.

Figure 6:
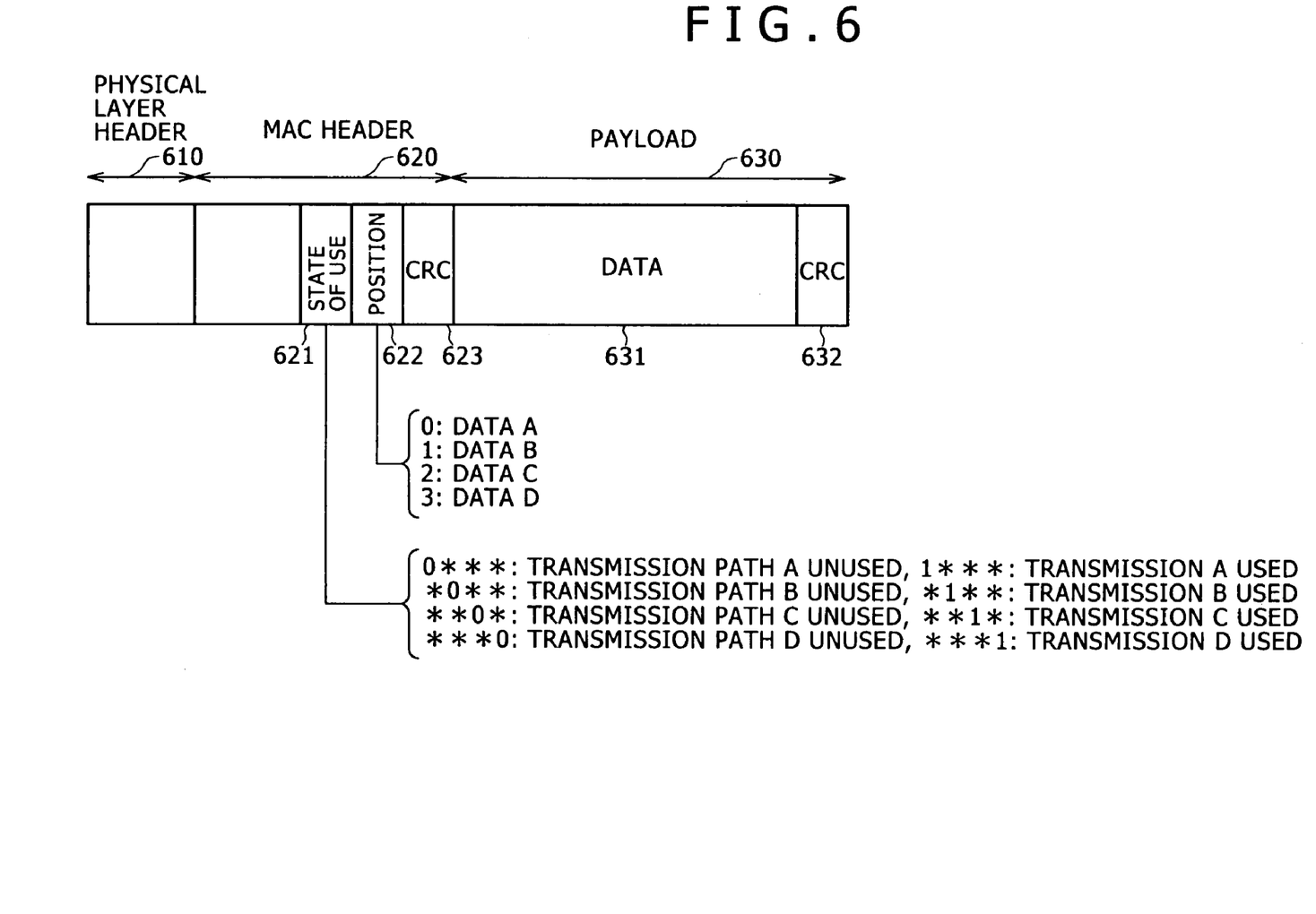
FIG. 6 is a diagram showing the frame structure of a data packet in the embodiment of the present invention.

FIG. 6 is a diagram showing the frame structure of a data packet in the embodiment of the present invention. The data packet is used when data is transmitted from the communication device. The data packet includes a physical layer header 610, a MAC header 620, and a payload 630. The physical layer header 610 is a header of a PLCP (physical layer convergence protocol) frame for transmitting information in a PLCP sublayer as a physical layer, for example. The physical layer header 610 includes fields indicating a transmission speed, a modulation system, PLCP frame length and the like. The MAC header 620 is a header of a MAC frame for transmitting information in a MAC sublayer. The MAC header 620 includes fields indicating a frame type, frame transmitting and receiving addresses and the like. The payload 630 is a payload of the MAC frame. The payload 630 includes data 631 and CRC 632.

In the embodiment of the present invention, the MAC header 620 in the data packet includes fields of a state of use 621, position 622, and CRC 623. The state of use 621 is a field indicating the state of use of each transmission path when this frame is transmitted. For example, a bit field is assigned to each transmission path, and whether transmission paths are used or not is indicated by the corresponding bit fields. The MIMO receiving units 330 and 360 receiving the frame can be informed whether there is a frame transmitted simultaneously in another channel. The position 622 is a field indicating a position of the data. For example, the position 622 indicates the position of the data among positions of four divided pieces of data. That is, in a case where one piece of data is divided into four pieces of data A, B, C, and D and the four pieces of data A, B, C, and D are transmitted, the position of the divided data included in the frame can be determined from "0" indicated when the data included in the frame is the piece of data A, "1" indicated when the data included in the frame is the piece of data B, "2" indicated when the data included in the frame is the piece of data C, or "3" indicated when the data included in the frame is the piece of data D. The CRC 623 is a cyclic redundancy check code for detecting a data error in the MAC header 620.

Figure 7:
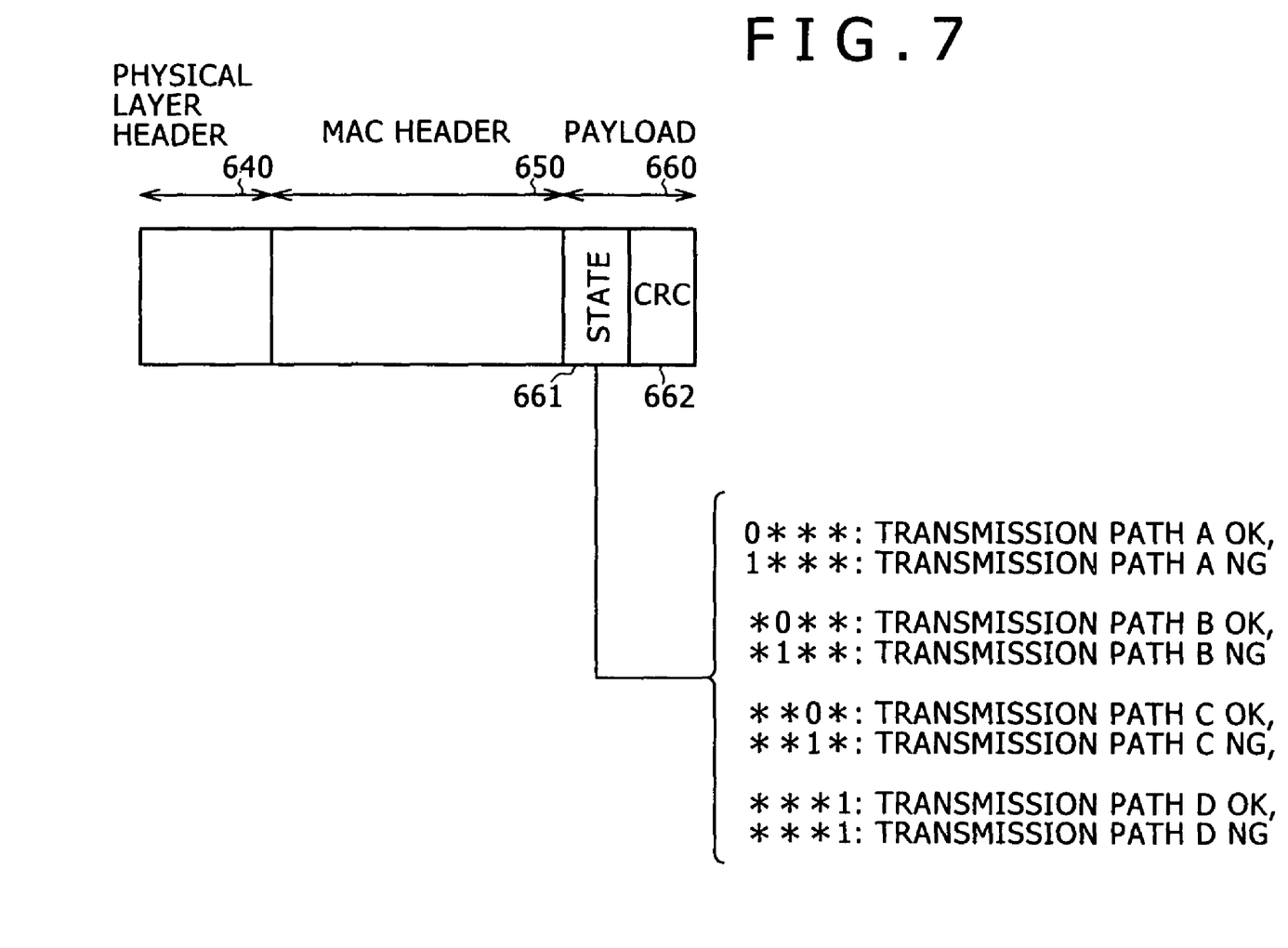
FIG. 7 is a diagram showing the frame structure of a response packet in the embodiment of the present invention.

FIG. 7 is a diagram showing the frame structure of a response packet in the embodiment of the present invention. The response packet is returned from a communication device that has received data to a communication device as the transmitter of the data. The response packet includes a physical layer header 640, a MAC header 650, and a payload 660. The physical layer header 640 and the MAC header 650 are similar to the physical layer header 610 and the MAC header 620 of the data packet in FIG. 6 in that the physical layer header 640 is a header of a PLCP frame for transferring information in the PLCP sublayer and the MAC header 650 is a header of a MAC frame for transferring information in the MAC sublayer.

The response packet in the embodiment of the present invention includes fields of a state 661 and CRC 662 in the payload 660. The state 661 is a field indicating the state of reception of the divided data. The CRC 662 is a cyclic redundancy check code for detecting a data error in the MAC header 650 and the payload 660.

The state 661 includes all states of reception of the data divided and transmitted simultaneously. Hence, a response packet in the transmission path A, for example, includes a state of reception in not only the transmission path A but also the transmission paths B to D. Thus, the state 661 includes information corresponding to the number of divided pieces of data. When data is divided into four pieces and the four pieces of data are transmitted, a first bit indicates a state of reception of the transmission path A, a second bit indicates a state of reception of the transmission path B, a third bit indicates a state of reception of the transmission path C, and a fourth bit indicates a state of reception of the transmission path D, for example. Specifically, when reception in the transmission path A is performed successfully, the first bit is "0," whereas when reception in the transmission path A is performed unsuccessfully, the first bit is "1." Similarly, when reception in the transmission path B is performed successfully, the second bit is "0," whereas when reception in the transmission path B is performed unsuccessfully, the second bit is "1." The same applies to the other transmission paths.

Figure 8:
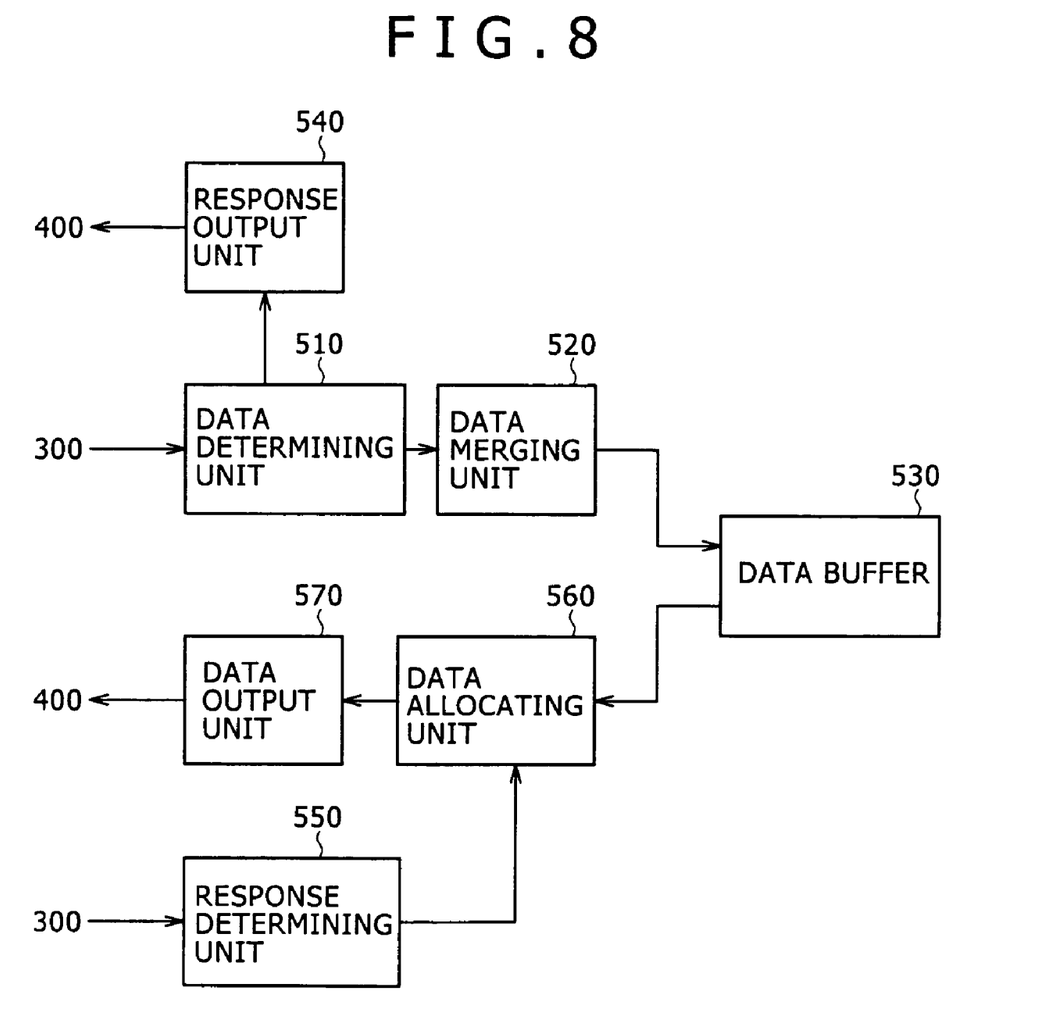
FIG. 8 is a diagram showing an example of the functional configuration of a communication control unit 500 in the embodiment of the present invention.

FIG. 8 is a diagram showing an example of the functional configuration of the communication control unit 500 in the embodiment of the present invention. In this case, the communication control unit 500 includes a data determining unit 510, a data merging unit 520, a data buffer 530, a response output unit 540, a response determining unit 550, a data allocating unit 560, and a data output unit 570.

The data determining unit 510 receives each piece of received data from the receiving unit 300, and determines the reception state of the data. Specifically, the data determining unit 510 determines whether there is an error or not on the basis of the outputs of the error correction circuits in a final stage in the MIMO receiving units 330 and 360, and also determines non-arrival of a frame or the like by grasping the state of use in each transmission path from the state of use 621 of the MAC header 620 in the frame structure of FIG. 6.

The data merging unit 520 collects pieces of data determined to be normal by the data determining unit 510, and merges the pieces of data into data in a state before division of the pieces of data. For example, when data is divided into four pieces of data A to D and the four pieces of data A to D are transmitted simultaneously, the data merging unit 520 grasps a data position from the position 622 of the MAC header 620 in the frame structure of FIG. 6, and then merges the four pieces of data A to D into an original data string.

The data buffer 530 is a buffer for temporarily retaining data to be communicated. The data buffer 530 retains received data merged by the data merging unit 520, and also retains transmitting data to be allocated by the data allocating unit 560.

The response output unit 540 outputs a response indicating whether data reception in each transmission path has been performed successfully or not, according to the determination result by the data determining unit 510. Specifically, the response output unit 540 outputs a response indicating whether reception has been performed successfully or not in each transmission path in the state 661 in the frame structure of FIG. 7 to each transmission path via the transmitting unit 400.

The response determining unit 550 in the communication device that has transmitted data receives a response to the transmission of the data, and determines a result of the transmission of the data. Specifically, the response determining unit 550 refers to the state 661 in the frame structure of FIG. 7 and thereby determines whether the transmission of the data in each transmission path has succeeded or not.

The data allocating unit 560 allocates data for a next data transmission according to a result of the determination by the response determining unit 550. Specifically, when all data has been transmitted in a previous data transmission, the data allocating unit 560 extracts new data retained in the data buffer 530, and then allocates the data to each transmission path. If there is untransmitted data in the previous data transmission, the data allocating unit 560 allocates data so as to retransmit the untransmitted data. Incidentally, data allocation at the time of the retransmission will be described later.

The data output unit 570 outputs each piece of data allocated by the data allocating unit 560 to the transmitting unit 400. Each of these pieces of data is transmitted as the data 631 of the payload 630 in the frame structure of FIG. 6.

Figure 9A:
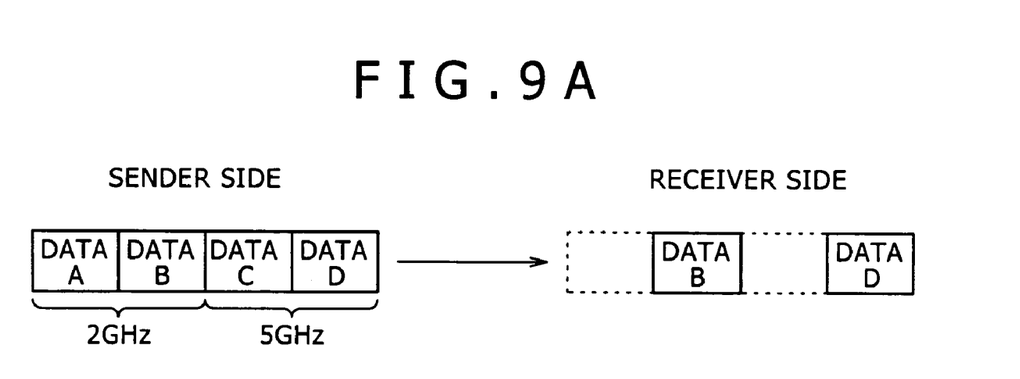
FIGS. 9A, 9B, and 9C are diagrams showing an example of a data allocation method at the time of data retransmission in the embodiment of the present invention.

FIGS. 9A, 9B, and 9C are diagrams showing an example of a data allocation method at the time of data retransmission in the embodiment of the present invention. Suppose that, as shown in FIG. 9A, a transmitter side divides data into four pieces of data A to D, for example, and transmits the pieces of data A and B by 2-GHz band MIMO and transmits the pieces of data C and D by 5-GHz band MIMO. Suppose that, as a result, a receiver side receives the piece of data B in the 2-GHz band and receives the piece of data D in the 5-GHz band. That is, suppose that the pieces of data A and C cannot be received successfully for some reason. This information on whether the reception has been successful or not is transferred from the receiver side to the transmitter side as the state 661 of the payload 660 in the structure of the frame of FIG. 7, which frame is output by the response output unit.

Figure 9B:
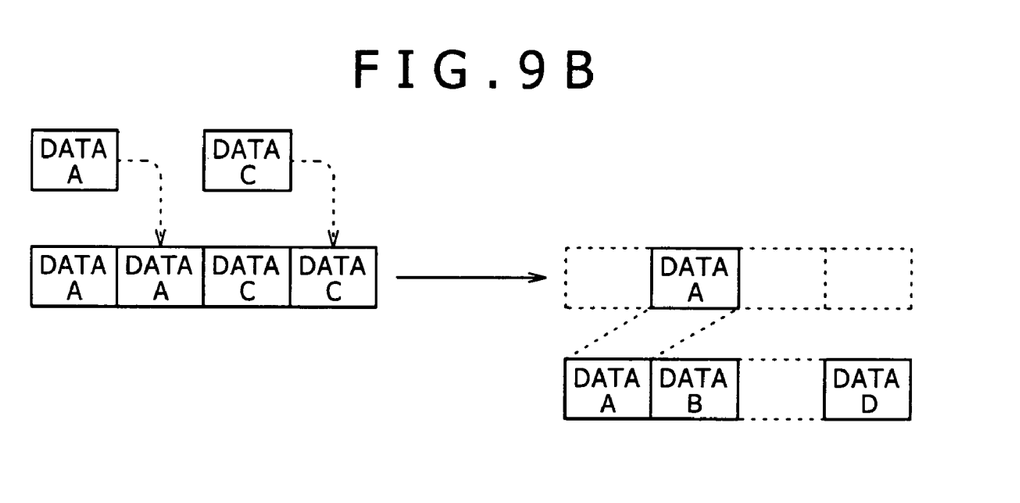

Then, the data allocating unit 560 on the transmitter side copies the pieces of data A and C in positions where the pieces of data B and D transmitted successfully have been present, respectively, as shown in FIG. 9B, and retransmits the entire data. Suppose that, as a result, the receiver side receives the piece of data A in the 2-GHz band. That is, suppose that the piece of data C in the 5-GHz band cannot be received successfully for some reason. This information on whether the reception has been successful or not is transferred from the receiver side to the transmitter side as the state 661 of the payload 660 in the structure of the frame of FIG. 7, which frame is output by the response output unit.

Figure 9C:
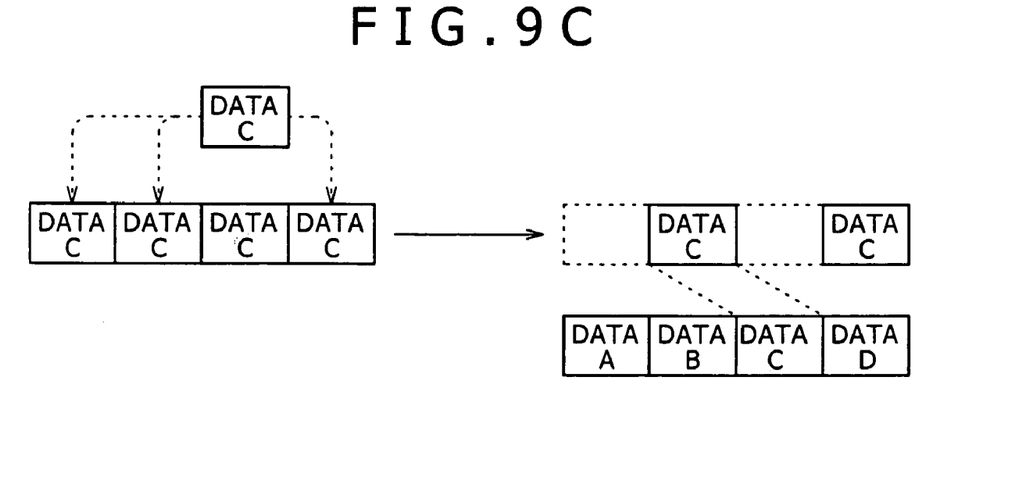

In response to this, the data allocating unit 560 on the transmitter side copies the piece of data C in positions where the pieces of data A, B, and D transmitted successfully have been present, as shown in FIG. 9C, and retransmits the entire data. Thus, the identical piece of data C is transmitted by the four transmission paths simultaneously. Suppose that as a result, the piece of data C is received successfully through two of the four transmission paths. The data merging unit 520 merges this piece of data C at an original position thereof, and stores the data in the data buffer 530.

Thus, by retransmitting data once transmitted unsuccessfully by another successful transmission path, a rate of success in retransmission can be improved.

Incidentally, while in this case, transmission paths are changed in effect by copying data without changing the configuration of the transmission paths, another method is conceivable in which the process in the space-time coding circuit 434 is bypassed by changing the switch 439 in FIG. 4, and the process in the minimum mean square error filter 333 and the maximum ratio synthesizer 345 is bypassed by changing the switch 339 in FIG. 5 according to the state of communication so that transmission and reception is performed by the frequency multiplex system.

In addition, by changing the output made to one of the two transmitting RF circuits for each frequency band in the transmitting unit 400 according to communication quality, a function of transmission diversity can be provided. Further, by changing the input made from one of the two receiving RF circuits for each frequency band in the receiving unit 300 according to communication quality, a function of reception diversity can be provided.

The operation of the communication device in the embodiment of the present invention will next be described with reference to the drawings.

Figure 10:
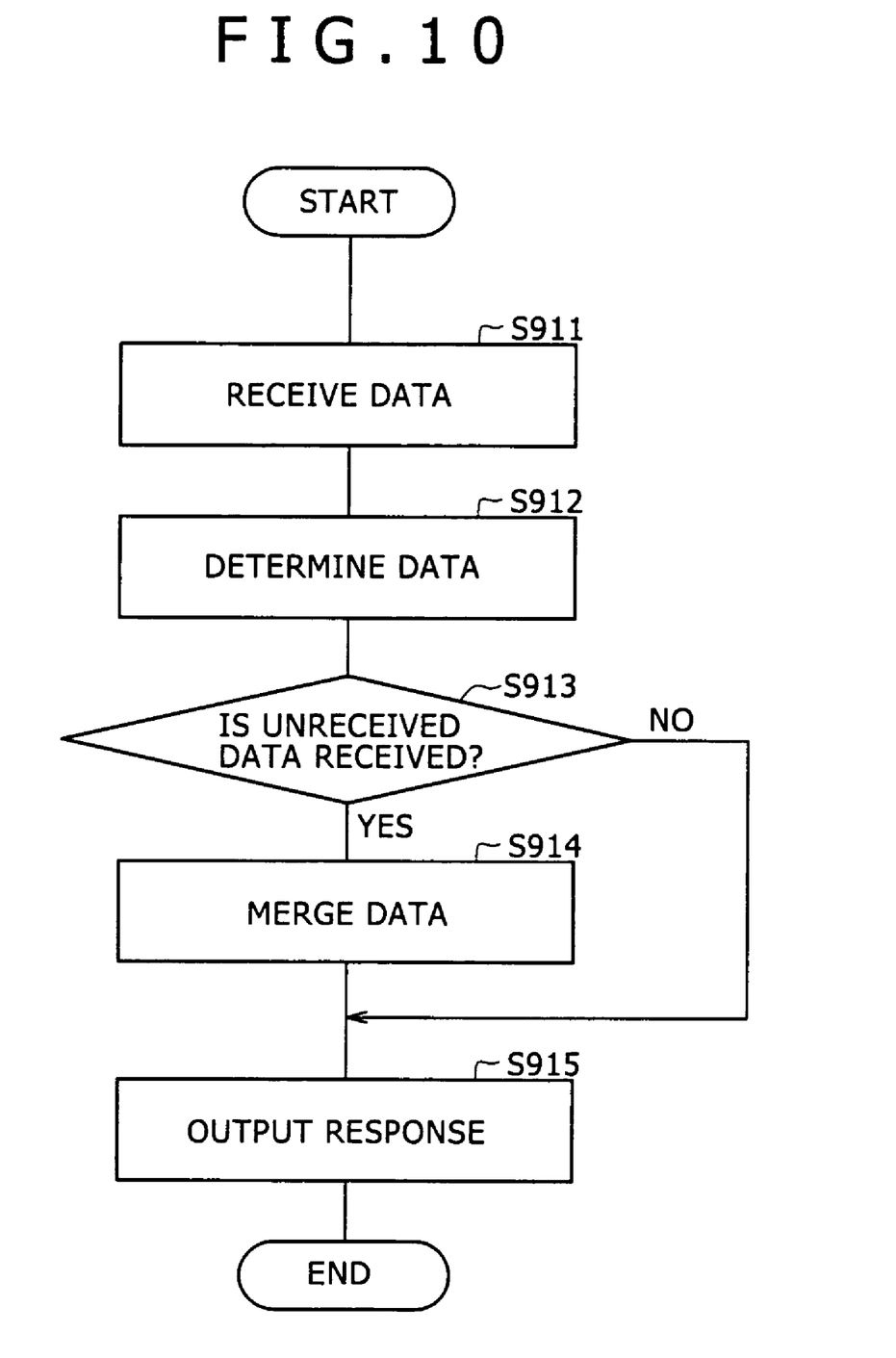
FIG. 10 is a flowchart of an example of the operation of the communication device in the embodiment of the present invention at the time of data reception.

FIG. 10 is a flowchart of an example of the operation of the communication device in the embodiment of the present invention at the time of data reception. When the communication device receives data by the receiving unit 300 (step S911), the data determining unit 510 evaluates the received data (step S912). Specifically, the data determining unit 510 determines whether or not there is an error on the basis of the outputs of the error correction circuits in the final stage in the MIMO receiving units 330 and 360, and also determines the non-arrival of a frame or the like by grasping the state of use in each transmission path from the state of use 621 of the MAC header 620 in the frame structure of FIG. 6.

When the successfully received data includes data that has not been received thus far (step S913), the data merging unit 520 merges the data (step S914). Specifically, the data merging unit 520 grasps a data position from the position 622 of the MAC header 620 in the frame structure of FIG. 6, and then merges pieces of data into an original data string. The data merging unit 520 stores the resulting data in the data buffer 530.

In addition, the response output unit 540 outputs a response according to the result of the determination of the data determining unit 510 (step S915). Specifically, the response output unit 540 outputs a response to each transmission path via the transmitting unit 400 indicating whether reception has been performed successfully in each transmission path in the state 661 in the frame structure of FIG. 7.

Figure 11:
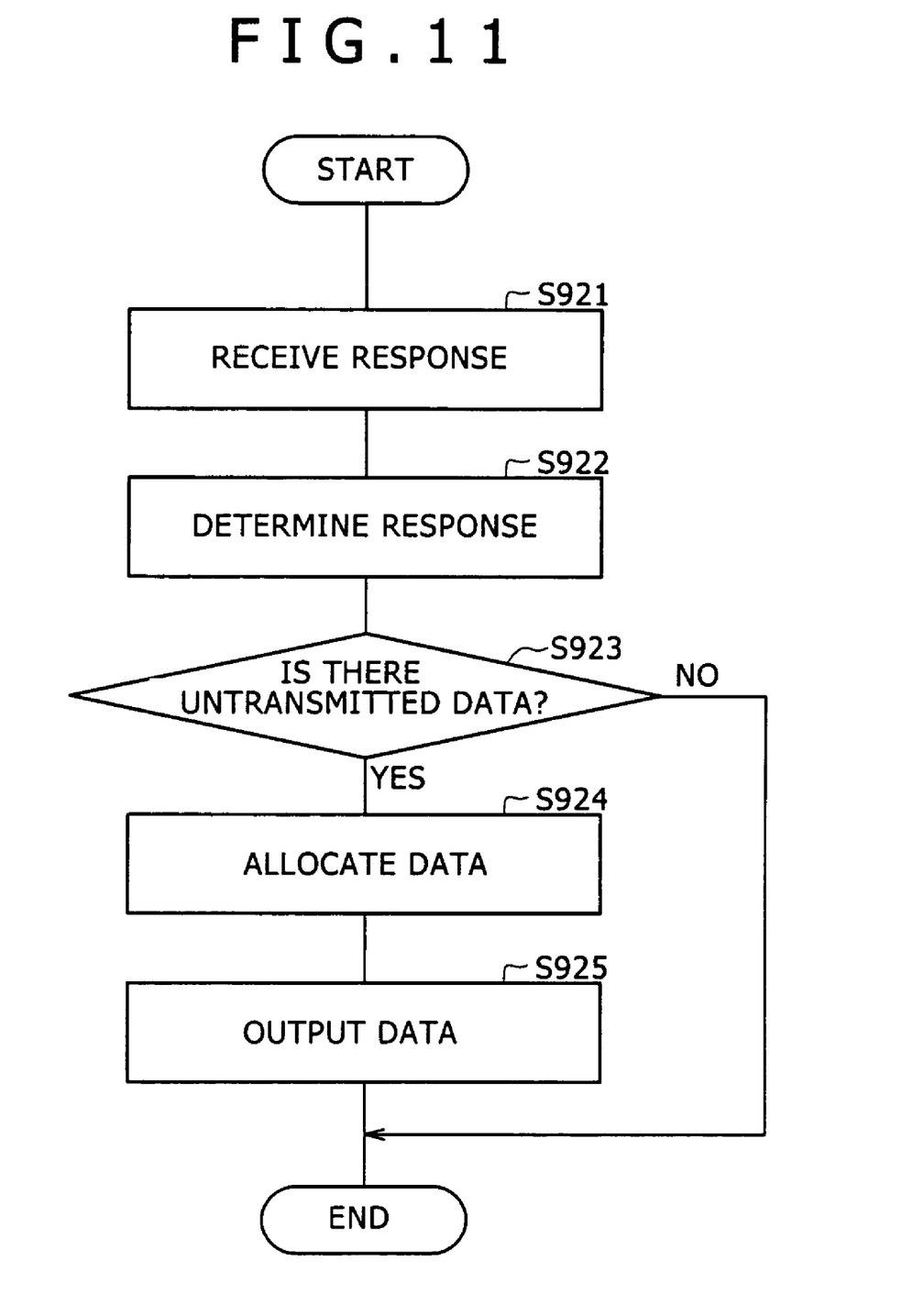
FIG. 11 is a flowchart of an example of the operation of the communication device in the embodiment of the present invention after data transmission.

FIG. 11 is a flowchart of an example of the operation of the communication device in the embodiment of the present invention after data transmission. When the communication device receives a response by the receiving unit 300 (step S921), the response determining unit 550 evaluates the response (step S922). Specifically, the response determining unit 550 refers to the state 661 in the frame structure of FIG. 7 and thereby determines whether the transmission of data in each transmission path has succeeded.

When a result of the determination indicates that there is data not yet transmitted successfully (step S923), the data allocating unit 560 allocates the data (step S924), and the data output unit 570 outputs the data (step S925). For example, as described with reference to FIGS. 9A, 9B, and 9C, the data is copied so that the untransmitted data also can be transmitted from another transmission path, and is then transmitted as the data 631 of the payload 630 in the frame structure of FIG. 6.

Thus, according to the embodiment of the present invention, by providing the MIMO receiving units 330 and 360 for different frequency bands in the receiving unit 300 and the MIMO transmitting units 430 and 460 for different frequency bands in the transmitting unit 400, it is possible to improve the transmission rate in radio communications without unnecessarily widening the frequency bands and while alleviating the complication of a data separation process.

While the embodiment of the present invention represents an example for embodying the present invention and has correspondence with specific inventive items in the claims as shown in the following, the present invention is not so limited, and is susceptible of various modifications without departing from the spirit of the present invention.

In claim 1, the first demodulating means corresponds to the MIMO receiving unit 330, for example. The second demodulating means corresponds to the MIMO receiving unit 360, for example. The data processing means corresponds to the communication control unit 500, for example.

In claim 2, the switching means corresponds to the switch 339, for example.

In claim 3, the data determining means corresponds to the data determining unit 510, for example. The response output means corresponds to the response output unit 540, for example.

In claim 4, the data merging means corresponds to the data merging unit 520, for example. The data buffer corresponds to the data buffer 530, for example.

In claim 5, the data processing means corresponds to the communication control unit 500, for example. The first modulating means corresponds to the MIMO transmitting unit 430, for example. The second modulating means corresponds to the MIMO transmitting unit 460, for example.

In claim 6, the switching means corresponds to the switch 339, for example.

In claim 7, the response determining means corresponds to the response determining unit 550, for example. The data allocating means corresponds to the data allocating unit 560, for example.

In claim 8, the data generating means and the data processing means correspond to the communication control unit 500, for example. The first modulating means corresponds to the MIMO transmitting unit 430, for example. The second modulating means corresponds to the MIMO transmitting unit 460, for example. The first demodulating means corresponds to the MIMO receiving unit 330, for example. The second demodulating means corresponds to the MIMO receiving unit 360, for example.

It is to be noted that the processing steps described in the embodiment of the present invention may be construed as a method including the series of steps, or may be construed as a program for making a computer perform the series of steps or a recording medium having the program stored thereon.

As an example of application of the present invention, the present invention is applicable to communication performed by a plurality of different transmission paths in a radio communication system, for example.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A receiving device, comprising:
   first demodulating means for demodulating data transmitted by at least one of a plurality of propagation paths in a first channel having transfer functions which are different from one another;

second demodulating means for demodulating data transmitted by at least one of a plurality of propagation paths in a second channel having transfer functions which are different from one another; and data processing means for merging the data demodulated by the first demodulating means and the data demodulated by the second demodulating means, wherein the data processing means includes data determining means for determining a respective reception state of demodulated data from the first demodulating means and the second demodulating means by determining whether an error exists therein and by determining a state of use of each propagation path of the first and second channels based upon state of use of each propagation path indicated in a field included in the data demodulated by the first demodulating means and the second demodulating means.

2. The receiving device as claimed in claim 1, wherein the first demodulating means includes switching means for switching between demodulation of data transmitted in a divided state by the plurality of propagation paths in the first channel and demodulation of data transmitted by one of the plurality of propagation paths in the first channel.

3. The receiving device as claimed in claim 1, wherein the data processing means further includes response output means for outputting a response indicating whether data reception in each of the plurality of propagation paths has succeeded based on the reception state of the demodulated data.

4. The receiving device as claimed in claim 1, wherein data in an original state is divided and transmitted in a divided state, the data processing means further including data merging means for collecting the demodulated data and merging the demodulated data into data in the original state; and a data buffer for retaining the merged data.

5. A receiving device, comprising:

a first demodulator operable to demodulate data transmitted by at least one of a plurality of propagation paths in a first channel having transfer functions which are different from one another;

a second demodulator operable to demodulate data transmitted by at least one of a plurality of propagation paths in a second channel having transfer functions which are different from one another; and a data processor operable to merge the data demodulated by the first demodulator and the data demodulated by the second demodulator, wherein the data processor includes a data determining unit operable to determine a respective reception state of demodulated data from the first demodulator and the second demodulator by determining whether an error exists therein and by determining a state of use of each propagation path of the first and second channels based upon state of use of each propagation path indicated in a field included in the data demodulated by the first demodulator and the second demodulator.

* * * * *